(12) United States Patent
Mishiro et al.

(10) Patent No.: US 11,179,695 B2
(45) Date of Patent: Nov. 23, 2021

(54) METHOD FOR PRODUCING MICROCAPSULE

(71) Applicant: Kao Corporation, Tokyo (JP)

(72) Inventors: Asami Mishiro, Koto-ku (JP); Daisuke Yamazaki, Wakayama (JP)

(73) Assignee: KAO CORPORATION, Tokyo (JP)

( * ) Notice: Subject to any disclaimer, the term of this patent is extended or adjusted under 35 U.S.C. 154(b) by 39 days.

(21) Appl. No.: 16/468,130

(22) PCT Filed: Dec. 14, 2017

(86) PCT No.: PCT/JP2017/044874
§ 371 (c)(1),
(2) Date: Jun. 10, 2019

(87) PCT Pub. No.: WO2018/110638
PCT Pub. Date: Jun. 21, 2018

(65) Prior Publication Data
US 2019/0299186 A1    Oct. 3, 2019

(30) Foreign Application Priority Data

Dec. 16, 2016    (JP) .............................. JP2016-244740

(51) Int. Cl.
| | | |
|---|---|---|
| *C11D 3/37* | (2006.01) | |
| *C11D 3/50* | (2006.01) | |
| *C08F 2/24* | (2006.01) | |
| *B01J 13/18* | (2006.01) | |
| *B01J 13/16* | (2006.01) | |
| *C11D 3/00* | (2006.01) | |

(52) U.S. Cl.
CPC ............... *B01J 13/16* (2013.01); *B01J 13/18* (2013.01); *C08F 2/24* (2013.01); *C11D 3/001* (2013.01); *C11D 3/3761* (2013.01); *C11D 3/505* (2013.01)

(58) Field of Classification Search
None
See application file for complete search history.

(56) References Cited

U.S. PATENT DOCUMENTS

| | | |
|---|---|---|
| 2003/0139549 A1 | 7/2003 | Savu et al. |
| 2005/0153839 A1 | 7/2005 | Tamura et al. |
| 2009/0289216 A1* | 11/2009 | Jung ........................ B01J 13/22 252/79 |
| 2010/0286018 A1 | 11/2010 | Hentze et al. |
| 2011/0046329 A1 | 2/2011 | Gotou et al. |
| 2012/0177924 A1 | 7/2012 | Jung et al. |
| 2015/0353805 A1 | 12/2015 | Jin et al. |
| 2016/0106635 A1 | 4/2016 | Yan et al. |
| 2016/0108340 A1 | 4/2016 | Feng et al. |
| 2016/0152928 A1 | 6/2016 | Weber et al. |

FOREIGN PATENT DOCUMENTS

| | | |
|---|---|---|
| CN | 101541417 | 9/2009 |
| CN | 102066498 | 5/2011 |
| JP | 1-168702 A | 7/1989 |
| JP | 2003-513123 A | 4/2003 |
| JP | 2005-219480 A | 8/2005 |
| JP | 2010-506988 A | 3/2010 |
| JP | 2011-515203 A | 5/2011 |
| JP | 2015-506815 A | 3/2015 |
| JP | 2016-530349 A | 9/2016 |
| WO | WO 2009/096300 A1 | 8/2009 |
| WO | WO 2014/109412 A1 | 7/2014 |

OTHER PUBLICATIONS

Extended European Search Report dated Jul. 20, 2020 in Application No. 17880114.8.
International Search Report dated Mar. 13, 2018 in PCT/JP2017/044874 filed on Dec. 14, 2017.

* cited by examiner

*Primary Examiner* — Lorna M Douyon
(74) *Attorney, Agent, or Firm* — Element IP, PLC

(57) ABSTRACT

The present invention relates to a process for producing microcapsules each including a core-shell type structure having a core portion containing at least one functional compound and a shell portion, the process including: step (1): mixing at least one functional compound, a water-soluble monomer (monomer (A)), a crosslinkable monomer having two or more (meth)acryloyl groups (monomer (B)), an oil-soluble polymerization initiator, an organic chain-transfer agent, and water, to obtain a monomer emulsion; and step (2): heating the monomer emulsion obtained in the step (1) to polymerize the monomers, thereby obtaining microcapsules, the organic chain transfer agent having a ClogP value of 3 or less.

14 Claims, No Drawings

METHOD FOR PRODUCING MICROCAPSULE

FIELD OF THE INVENTION

The present invention relates to a process for producing microcapsules.

BACKGROUND OF THE INVENTION

Hitherto, it has been attempted to encapsulate fragrance materials or medical ingredients, etc. in microcapsules and incorporate in products, thereby prolonging their effects.

In particular, one of important performances of fabric treatment products, cosmetics, detergents, and so on is to impart a fragrance to clothes or human body, and therefore, products having high persistence of a fragrance are demanded.

In such a situation, synthesis of microcapsules by an emulsion polymerization method has been studied.

JP 2011-515203 A (PTL 1) discloses microcapsules containing scents or fragrances for which mechanical stability of the microcapsules and retention capacity of a shell for the scents or fragrances located in a core are selected such that as compared with the prior art, improved retention capacity and release capacity of the scents or fragrances are achieved, the microcapsules being microcapsules having a core a) containing a scent or fragrance and a shell b), wherein b) is obtainable by polymerization of one or more C1 to C24-alkyl ester(s) of acrylic acid and/or methacrylic acid and at least two different bifunctional or polyfunctional monomers.

In addition, JP 2010-506988 A (PTL 2) discloses microcapsules having a small particle size and having excellent durability, the microcapsules including a capsule core, a capsule wall, and also, disposed on the outer surface of the capsule wall, a polyelectrolyte having an average molecular weight in a range from 500 g/mol to 10 million g/mol, the capsule wall being constructed of 10 to 100% by mass of one or more C1 to C24-alkyl esters of acrylic acid and/or methacrylic acid (monomer I), 0 to 80% by mas of a water-insoluble or sparingly water-soluble bifunctional or polyfunctional monomer (monomer II), and 0 to 90% by mass of other monomer (monomer III) all based on the total mass of the monomers, wherein the microcapsules have an average particle size of 1.5 to 2.5 μm and 90% of the particles have a particle size≤4 μm.

JP 2015-506815 A (PTL 3) discloses a microcapsule including a core and a polymeric shell enclosing the core, which is endowed with a reduced leakage of the material contained in the core upon storage, when the microcapsule is dispersed in a liquid medium and used in, for example, a non-edible consumer goods product, a laundry product, a personal care product or a cosmetic product, the microcapsule having an average particle size of 7.5 to 50 microns, wherein the core contains a core material containing an emulsifiable fragrance; the polymeric shell contains a monomer mixture of a monomer (I) and a monomer (II) in a polymerized form; the monomer (I) is present in an amount of 30% by weight to 80% by weight of a total weight of the monomers (I) and (II) in the mixture; and the monomer (II) is present in an amount of 20% by weight to 70% by weight of a total weight of the monomers (I) and (II) in the mixture.

US 2016/0108340 A (PTL 4) discloses a process of forming microcapsules having improved physical properties and release control, wherein a shell wall is formed from an oil phase (meth)acrylate polymer wall forming composition and an aqueous phase (meth)acrylate polymer wall forming composition; the oil phase (meth)acrylate wall forming composition contains a combination of specified monomer, oligomer, and/or prepolymer; the aqueous phase (meth)acrylate polymer wall forming composition contains at least one water-soluble or dispersible (meth)acrylate monomer and/or oligomer; and the shell wall is formed by concurrent or sequential polymerization of the wall forming compositions at an interface of the oil phase and the aqueous phase.

SUMMARY OF THE INVENTION

The present invention relates to a process for producing microcapsules each including a core-shell type structure having a core portion containing at least one functional compound and a shell portion, the process including:

step (1): mixing at least one functional compound, a water-soluble monomer (monomer (A)), a crosslinkable monomer having two or more (meth)acryloyl groups (monomer (B)), an oil-soluble polymerization initiator, an organic chain transfer agent, and water, to obtain a monomer emulsion; and step (2): heating the monomer emulsion obtained in the step (1) to polymerize the monomers, thereby obtaining microcapsules, the organic chain transfer agent having a ClogP value of 3 or less.

DETAILED DESCRIPTION OF THE INVENTION

Microcapsules are in the form of very fine particles by themselves and have a very thin microcapsule shell (hereinafter also referred to as a "shell"). Therefore, leakage of core components into the outside environment is generated owing to dissolution of the core components into the shell or diffusion and penetration of the core components through micropores present in the shell. The microcapsules obtained by the processes described in PTLs 1 to 4 were still insufficient regarding encapsulation stability of a functional compound, such as a fragrance material, probably owing to insufficient denseness or strength of a shell thereof.

As a result of extensive and intensive investigations made by the present inventors, it has been found that the aforementioned problem can be solved by using a specified organic chain transfer agent at the time of production of microcapsules and allowing a shell to have a specified monomer-derived structural unit.

Specifically, the present invention relates to a process for producing microcapsules each including a core-shell type structure having a core portion containing at least one functional compound and a shell portion, the process including:

step (1): mixing at least one functional compound, a water-soluble monomer (monomer (A)), a crosslinkable monomer having two or more (meth)acryloyl groups (monomer (B)), an oil-soluble polymerization initiator, an organic chain transfer agent, and water, to obtain a monomer emulsion; and step (2): heating the monomer emulsion obtained in the step (1) to polymerize the monomers, thereby obtaining microcapsules, the organic chain transfer agent having a ClogP value of 3 or less.

In accordance with the present invention, microcapsules having excellent encapsulation stability of a functional compound, such as a fragrance material, can be produced.

The process for producing microcapsules of the present invention is hereunder described in detail. In this specification, the "(meth)acrylic acid" means "acrylic acid" or "methacrylic acid"; the "(meth)acrylate" means "acrylate" or "methacrylate"; and the "(meth)acryloyl" means "acryloyl" or "methacryloyl".

In this specification, a prescription considered to be preferred can be arbitrarily adopted, and a combination of preferred prescriptions is more preferred.

Although the reason why the microcapsules obtained by the process of the present invention have excellent encapsulation stability of a functional compound, such as a fragrance material, is not elucidated yet, the following may be considered.

In the process for producing microcapsules of the present invention, a water-soluble monomer (monomer (A)) and an organic chain transfer agent having a ClogP value of 3 or less are used. It may be considered that at the time of production of capsules of a core-shell type structure in which a functional compound, such as a fragrance material, is encapsulated, the water-soluble monomer (monomer (A)) having high hydrophilicity is distributed into both an oil phase and an aqueous phase, and the organic chain transfer agent having a ClogP value of 3 or less tends to exist in an aqueous phase, or in the vicinity of an interface between an oil phase and an aqueous phase. As the polymerization is advanced in the oil phase, a polymer having a crosslinked structure derived from a water-soluble monomer (monomer (A)) and a crosslinkable monomer having two or more (meth)acryloyl groups (monomer (B)) is formed and transferred into an oil-water interface owing to the presence of a functional group having high hydrophilicity (preferably a carboxy group). A polymer chain comes out into the oil phase, and the organic chain transfer agent efficiently reacts in the vicinity of the oil-water interface, whereby excessive growth of the polymer is suppressed. As a result, it may be considered that homogeneity of the crosslinked structure of the shell is enhanced, whereby denseness of the shell is improved, and leakage of the materials to be encapsulated is suppressed, so that the encapsulation stability of the functional compound, such as a fragrance material, is improved.

[Process for Producing Microcapsules]

The process for producing microcapsules of the present invention is a process for producing microcapsules each including a core-shell type structure having a core portion containing at least one functional compound and a shell portion. The process of the present invention includes the following steps (1) and (2).

Step (1): mixing at least one functional compound, a water-soluble monomer (monomer (A)), a crosslinkable monomer having two or more (meth)acryloyl groups (monomer (B)), an oil-soluble polymerization initiator, an organic chain transfer agent having a ClogP value of 3 or less, and water, to obtain a monomer emulsion Step (2): heating the monomer emulsion obtained in the step (1) to polymerize the monomers, thereby obtaining microcapsules (Step (1))

The step (1) is a step of mixing at least one functional compound, a water-soluble monomer (monomer (A)), a crosslinkable monomer having two or more (meth)acryloyl groups (monomer (B)), an oil-soluble polymerization initiator, an organic chain transfer agent having a ClogP value of 3 or less, and water, to obtain a monomer emulsion.

The step of obtaining a monomer emulsion of the step (1) may be performed at room temperature or by heating. In addition, it does not matter the addition order of the functional compound, the monomers, the oil-soluble polymerization initiator, and the organic chain transfer agent.

The step (1) preferably includes the following steps (1-1) to (1-3):

step (1-1): mixing at least one functional compound, a water-soluble monomer (monomer (A)), a crosslinkable monomer having two or more (meth)acryloyl groups (monomer (B)), and an oil-soluble polymerization initiator, to obtain an oily solution;

step (1-2): mixing an organic chain transfer agent having a ClogP value of 3 or less, an emulsifier, and water, to obtain an aqueous solution; and step (1-3): mixing the oily solution obtained in the step (1-1) and the aqueous solution obtained in the step (1-2) and emulsifying the mixture, to obtain a monomer emulsion.

The step (1) is hereunder specifically described while dividing it into the steps (1-1) to (1-3), but it should be construed that the present invention is not limited to the foregoing process. In addition, in each of the steps, heating may be performed; and the raw materials other than the organic chain transfer agent may be mixed and emulsified, followed by adding the organic chain transfer agent under heating, to obtain a monomer emulsion. For example, in the preparation of an oily solution (step (1-1)), the organic chain transfer agent may be added; and in the preparation of an aqueous solution (step (1-2)), the monomer (A) may be added. In addition, in the preparation of an aqueous solution (step (1-2)), the organic chain transfer agent is not mixed, but after the preparation of a monomer emulsion (step (1-3)), heating may be performed, followed by adding the organic chain transfer agent. In addition, in the preparation of an oily solution (step (1-1)), the oil-soluble polymerization initiator is not mixed, but after the preparation of a monomer emulsion (step (1-3)), heating may be performed, followed by adding the oil-soluble polymerization initiator.

(Step (1-1))

The step (1-1) is a step of mixing the at least one functional compound, the monomer (A), the monomer (B), and the oil-soluble polymerization initiator, to obtain an oily solution.

<Functional Compound>

The functional compound as referred to in the present invention is a compound to be encapsulated in a core of the microcapsule and is a compound having a function to apply a physical or chemical action to a person or material to which the microcapsule is applied.

The functional compound which is used in the step (1) is preferably at least one selected from the group consisting of a fragrance material, a fragrance precursor, an oil, an antioxidant, a cooling agent, a dye, a pigment, a silicone, a solvent, and an oil-soluble polymer, more preferably at least one selected from the group consisting of a fragrance material, a fragrance precursor, an oil, an antioxidant, a cooling agent, and a solvent, and still more preferably at least one selected from the group consisting of a fragrance material, a fragrance precursor, and a cooling agent. Examples of the fragrance material include organic compounds, such as a terpene-based alcohol, a terpene-based ketone, an aromatic aldehyde, an aromatic ester, and a fatty acid ester. Examples of the terpene-based alcohol include L-menthol. Examples of the fragrance precursor include compounds capable of releasing a fragrance component through a reaction with water. Specifically, examples thereof include a silicic acid ester compound having an alkoxy component derived from a fragrance alcohol and a fatty acid ester compound having an alkoxy component derived from a fragrance alcohol. The functional compound is preferably a terpene-based alcohol, and more preferably L-menthol.

<Monomer (A): Water-soluble Monomer>

The water-soluble monomer (monomer (A)) is copolymerized with the crosslinkable monomer having two or more (meth)acryloyl groups (monomer (B)) to form a copolymer (X), and the copolymer (X) constitutes a shell of the microcapsule. Here, the water-soluble monomer means a monomer having a ClogP value of 1.0 or less. The monomer (A) has a functional group having high hydrophilicity, for example, a carboxy group, a hydroxy group, an amide group, or a functional group of a metal salt type thereof (e.g., COONa). Therefore, by using the monomer (A), the polymer transfers into an oil-water interface at the time of polymerization, whereby the shell of the microcapsule can be efficiently formed, and encapsulation properties of the functional compound of the microcapsule can be improved.

The water-soluble monomer preferably has either one of a carboxy group or a hydroxy group or both of them, and preferably has a carboxy group.

The monomer (A) is preferably a monomer having a carboxy group, and more preferably an unsaturated compound having a carboxy group. Although the number of carboxy groups is not particularly limited, from the viewpoint of controlling the reaction, the monomer (A) preferably has one or two carboxy groups, and more preferably has one carboxy group. In addition, the monomer (A) preferably has a structure having an ethylenic double bond. Specifically, examples of the structure having an ethylenic double bond include a (meth)acryloyl structure, a vinyl structure, and an allyl structure. Of these, from the viewpoint of reactivity, a (meth)acryloyl structure is preferred.

The monomer (A) is preferably at least one selected from the group consisting of methacrylic acid (0.93), acrylic acid (0.35), fumaric acid (0.46), maleic acid (0.46), itaconic acid (−0.34), 2-hydroxyethyl methacrylate (0.47), glycidyl methacrylate (0.81), polyethylene glycol methacrylate (0.47), N,N-dimethylaminoethyl methacrylate (0.97), and methyl acrylate (0.80) (the numerical values in the parentheses each express a ClogP value). Of these, from the viewpoint of promoting efficient shell formation to improve encapsulation properties of the functional compound of the microcapsule, at least one selected from the group consisting of methacrylic acid, acrylic acid, and 2-hydroxyethyl methacrylate is more preferred, and methacrylic acid is still more preferred.

From the viewpoint of encapsulation properties of the functional compound of the microcapsule, the use amount of the monomer (A) is preferably 25% by mass or more, more preferably 30% by mass or more, and still more preferably 35% by mass or more, and it is preferably 80% by mass or less, more preferably 70% by mass or less, and still more preferably 60% by mass or less, based on 100% by mass of a total amount of the monomers used.

<Monomer (B): Crosslinkable Monomer having Two or More (Meth)acryloyl Groups>

The crosslinkable monomer having two or more (meth)acryloyl groups (monomer (B)) is copolymerized with the water-soluble monomer (monomer (A)) to form a copolymer (X), and the copolymer (X) constitutes a shell of the microcapsule. Since the monomer (B) is a crosslinkable monomer having two or more reaction points, by using the monomer (B), it is able to form a three-dimensional bond to efficiently form a shell of the microcapsule, so that encapsulation properties of the functional compound of the microcapsule can be improved.

Specific examples of the monomer (B) include a diester between a diol compound and (meth)acrylic acid, urethane diacrylate, and a diester, a triester, or a tetraester between a trihydric or higher polyhydric alcohol and (meth)acrylic acid.

Specific examples of the diester between a diol compound and (meth)acrylic acid include 1,4-butanediol di(meth)acrylate, 1,3-butanediol di(meth)acrylate, 1,6-hexanediol di(meth)acrylate, 1,9-nonanediol di(meth)acrylate, 1,10-decanediol di(meth)acrylate, ethylene glycol di(meth)acrylate, diethylene glycol di(meth)acrylate, triethylene glycol di(meth)acrylate, tetraethylene glycol di(meth)acrylate, propylene glycol di(meth)acrylate, dipropylene glycol di(meth)acrylate, tripropylene glycol di(meth)acrylate, neopentyl glycol di(meth)acrylate, tricyclodecanedimethanol di(meth)acrylate, bisphenol A di(meth)acrylate, polyethylene glycol di(meth)acrylate, polypropylene glycol di(meth)acrylate, polyethylene glycol polypropylene glycol di(meth)acrylate, and polyhexamethylene glycol di(meth)acrylate.

Specific examples of the diester between a trihydric or higher polyhydric alcohol and (meth)acrylic acid include trimethylolpropane di(meth)acrylate, pentaerythritol di(meth)acrylate, dipentaerythritol di(meth)acrylate, and glycerin di(meth)acrylate. Specific examples of the triester between a trihydric or higher polyhydric alcohol and (meth)acrylic acid include trimethylolpropane tri(meth)acrylate and pentaerythritol tri(meth)acrylate. Specific examples of the tetraester between a trihydric or higher polyhydric alcohol and (meth)acrylic acid include pentaerythritol tetra(meth)acrylate.

These can be used either alone or in combination of two or more thereof.

Of these, from the viewpoint of increasing a shell strength to improve encapsulation properties of the functional compound of the microcapsule and the viewpoint of reactivity, at least one selected from the group consisting of ethylene glycol di(meth)acrylate, 1,4-butanediol di(meth)acrylate, 1,3-butanediol di(meth)acrylate, 1,6-hexanediol di(meth)acrylate, and 1,10-decanediol di(meth)acrylate is preferred; at least one selected from the group consisting of ethylene glycol di(meth)acrylate, 1,4-butanediol di(meth)acrylate, 1,3-butanediol di(meth)acrylate, and 1,6-hexanediol di(meth)acrylate is more preferred; and ethylene glycol dimethacrylate is still more preferred.

From the viewpoint of encapsulation properties of the functional compound of the microcapsule, the use amount of the monomer (B) is preferably 10% by mass or more, more preferably 20% by mass or more, and still more preferably 25% by mass or more, and it is preferably 60% by mass or less, more preferably 50% by mass or less, and still more preferably 45% by mass or less, based on 100% by mass of a total amount of the monomers used.

<Other Monomer>

In the present invention, other monomer than the monomers (A) and (B) may be used.

Examples of the other monomer than the monomers (A) and (B) include a (meth)acrylic acid ester having a ClogP value of more than 1.0, a styrene, an olefin, a halovinyl compound, a vinyl ester, a vinyl ether, a vinylidene halide, and an N-vinyl compound.

Specific examples of the (meth)acrylic acid ester having a ClogP value of more than 1.0 include an alkyl (meth)acrylate, benzyl (meth)acrylate, and dimethylaminoethyl (meth)acrylate. Specific examples of the styrene include styrene, methylstyrene, chlorostyrene, and methoxystyrene. Specific examples of the olefin include ethylene, propylene, and butadiene. Specific examples of the halovinyl compound include vinyl chloride. Specific examples of the vinyl ester include vinyl acetate and vinyl propionate. Specific examples of the vinyl ether include methyl vinyl ether. Specific examples of the vinylidene halide include vinylidene chloride. Specific examples of the N-vinyl compound include N-vinylpyrrolidone.

These can be used either alone or in combination of two or more thereof.

Examples of the alkyl (meth)acrylate having a ClogP value of more than 1.0 include ester compounds between (meth)acrylic acid and an alcohol having 1 or more and 24 or less carbon atoms, and specifically, examples thereof include methyl methacrylate, ethyl (meth)acrylate, and propyl (meth)acrylate. These can be used either alone or in combination of two or more thereof. Of these, from the viewpoint of increasing a shell strength to improve retention properties of the functional compound of the microcapsule, methyl (meth)acrylate or ethyl (meth)acrylate is preferred, and methyl (meth)acrylate is more preferred. The ClogP value of methyl methacrylate is 1.28.

In the case of using the other monomer than the monomers (A) and (B), from the viewpoint of encapsulation properties of the functional compound of the microcapsule, the use amount thereof is preferably 1% by mass or more, and more preferably 5% by mass or more, and it is preferably 20% by mass or less, and more preferably 15% by mass or less, based on 100% by mass of a total amount of the monomers used.

<Oil-Soluble Polymerization Initiator>

The polymerization initiator is not particularly limited so long as it is oil-soluble, and examples thereof include azo-based initiators, such as 2,2'-azobisisobutyronitrile, 2,2'-azobis(2,4-dimethylvaleronitrile), and dimethyl-2,2'-azobis(2-methylpropionate); and peroxide-based initiators, such as lauroyl peroxide, benzoyl peroxide, octanoyl peroxide, benzoyl orthochloroperoxide, methyl ethyl ketone peroxide, diisopropyl peroxydicarbonate, cumene hydroperoxide, t-butyl hydroperoxide, and t-butyl peroxyneodecanoate. Of these, 2,2'-azobis(2,4-dimethylvaleronitrile) is preferred.

The use amount of the oil-soluble polymerization initiator is preferably 0.1 parts by mass or more, and more preferably 0.3 parts by mass or more, and it is preferably 10 parts by mass or less, and more preferably 5 parts by mass or less, based on 100 parts by mass of a total amount of the monomers used.

As for the oil-soluble polymerization initiator, from the viewpoint of increasing a rate of reaction of the polymerization reaction to not only minimize the amount of the residual monomers but also reduce the residual amount of the polymerization initiator in the aqueous phase, a 10-hour half-life temperature of the polymerization initiator is preferably 10° C. or higher, more preferably 25° C. or higher, and still more preferably 30° C. or higher, and it is preferably 100° C. or lower, more preferably 80° C. or lower, and still more preferably 70° C. or lower.

The "10-hour half-life temperature of the oil-soluble polymerization initiator" as referred to herein means a temperature at which on the occasion of undergoing a thermal decomposition reaction at a fixed temperature, a concentration of the oil-soluble polymerization initiator becomes a half of the concentration before the reaction. For example, the 10-hour half-life temperature of 2,2'-azobis(2,4-dimethylvaleronitrile) is 51° C.

(Step (1-2))

The step (1-2) is a step of mixing an organic chain transfer agent having a ClogP value of 3 or less, an emulsifier, and water, to obtain an aqueous solution.

<Organic Chain Transfer Agent>

In the present invention, an organic chain transfer agent having a ClogP value of 3 or less is used. In view of the fact that the ClogP value of the organic chain transfer agent is 3 or less, the encapsulation stability of the functional compound, such as a fragrance material, can be improved.

The ClogP value of the organic chain transfer agent is 3 or less, and from the viewpoint of controlling the reaction of the water-soluble monomer, the ClogP value of the organic chain transfer agent is preferably 2 or less, more preferably 1.5 or less, and still more preferably 1 or less, and it is preferably −5 or more, more preferably −3 or more, and still more preferably −1 or more.

Suitable examples of the organic chain transfer agent having a ClogP value of 3 or less include a thiol compound, and specifically, examples thereof include 2-mercaptoethanesulfonic acid (−1.95), thiomalic acid (−0.88), 1-thioglycerol (−0.84), N-acetylcysteine (−0.66), mercaptoethanol (−0.2), mercaptoacetic acid (0.09), mercaptopropanol (0.29), 3-mercaptopropionic acid (0.43), 1,8-dimercapto-3,6-dioxaoctane (0.66), ethanethiol (0.78), 2-ethyl thioglycolate (0.81), ethanethiol (1.27), 2-methyl-2-propanethiol (2.14), 1-butanethiol (2.28), and thiophenol (2.52) (the numerical values in the parentheses each express a ClogP value). Of these, from the viewpoint of improving the encapsulation stability of the functional compound, such as a fragrance material, and the viewpoint of easiness of availability, etc., at least one selected from the group consisting of 1-thioglycerol, N-acetylcysteine, 3-mercaptopropionic acid, and 2-ethyl thioglycolate is preferred.

In this specification, the ClogP value is a value calculated by using EPI Suite (EPIWEB ver. 4.1) provided by the US EPA. The ClogP value of polyethylene glycol methacrylate was calculated on a basis of the structural formula of ethylene glycol methacrylate.

As for the use amount of the organic chain transfer agent, although its suitable amount varies with chain transfer ability of the compound to be used, from the viewpoint of reducing the residual amount in the resulting fragrance capsule and the viewpoint of improving the encapsulation stability of the functional compound, such as a fragrance material, the use amount of the organic chain transfer agent is preferably 0.05 parts by mass or more, more preferably 0.1 parts by mass or more, and still more preferably 0.5 parts by mass or more, and it is preferably 10 parts by mass or less, more preferably 5 parts by mass or less, and still more preferably 3 parts by mass or less, based on 100 parts by mass of a total amount of the monomers used.

From the viewpoint of improving the encapsulation stability of the functional compound, such as a fragrance material, the use amount of the organic chain transfer agent is preferably 0.5 parts by mass or more, more preferably 1.0 part by mass or more, and still more preferably 1.5 parts by mass or more, and it is preferably 20 parts by mass or less, more preferably 10 parts by mass or less, and still more preferably 5 parts by mass or less, based on 100 parts by mass of the use amount of the monomer (A).

<Emulsifier>

Although the emulsifier is not particularly limited, at least one surfactant selected from an anionic surfactant, a cationic surfactant, a nonionic surfactant, and a polymer dispersant can be used.

As the anionic surfactant, at least one selected from an alkyl sulfate salt, a polyoxyethylene alkyl ether sulfate salt, a dipotassium alkenyl succinate, and a fatty acid sodium having 8 or more and 22 or less carbon atoms can be used.

As the cationic surfactant, at least one selected from an alkyltrimethylammonium chloride and a dialkyldimethylammonium chloride can be used.

As the nonionic surfactant, at least one selected from a polyoxyethylene alkyl ether having 8 or more and 22 or less carbon atoms, a polyoxyethylene alkyl phenyl ether, polyoxyethylene polyoxypropylene glycol, a sorbitan fatty acid ester (e g , sorbitan monostearate and sorbitan monopalmitate), and a sugar fatty acid ester (sugar ester) can be used.

As the polymer dispersant, at least one selected from polyvinyl alcohol, a cellulose compound (e.g., methyl cellulose, ethyl cellulose, hydroxypropyl cellulose, carboxymethyl cellulose, and hydroxyethyl cellulose, and carboxyethyl cellulose), a polyacrylate, a polymethacrylate, and a polyacrylic acid-styrene copolymer can be used.

The emulsifier is preferably a polymer dispersant, and more preferably polyvinyl alcohol.

From the viewpoint of obtaining a stable emulsion, the addition amount of the emulsifier is preferably 0.5 parts by mass or more, more preferably 1.0 part by mass or more, and still more preferably 1.5 parts by mass or more, and it is preferably 20 parts by mass or less, more preferably 18 parts by mass or less, and still more preferably 15 parts by mass or less, based on 100 parts by mass of the oily solution obtained in the step (1-1).

(Step (1-3))

The step (1-3) is a step of mixing the oily solution obtained in the step (1-1) and the aqueous solution obtained in the step (1-2) and emulsifying the mixture, to obtain a monomer emulsion. The obtained monomer emulsion is an oil-in-water type emulsion.

From the viewpoint of productivity and the viewpoint of obtaining a stable emulsion, a mixing ratio of the oily solution and the aqueous solution is preferably 5% by mass or more, more preferably 10% by mass or more, and still more preferably 15% by mass or more, and it is preferably 50% by mass or less, more preferably 40% by mass or less, and still more preferably 35% by mass or less, in terms of a concentration of the oily solution in the obtained monomer emulsion.

Although a stirring unit to be used for preparation of the monomer emulsion is not particularly limited, a homogenizer having a strong shear force, a high-pressure disperser, an ultrasonic disperser, and the like can be used. In addition, a homomixer, "DISPER" (a trade name, manufactured by PRIMIX Corporation), "CLEAMIX" (a trade name, manufactured by M Technique Co., Ltd.), "CAVITRON" (a trade name, manufactured by Pacific Machinery & Engineering Co., Ltd.), and the like can also be used.

(Step (2))

The step (2) is a step of heating the monomer emulsion obtained in the step (1) (preferably the steps (1-1) to (1-3)) to polymerize the monomers, thereby obtaining microcapsules.

A preferred polymerization temperature is a "temperature higher by 5° C. than the 10-hour half-life temperature of the oil-soluble polymerization initiator" or higher and a "temperature higher by 20° C. than the 10-hour half-life temperature of the oil-soluble polymerization initiator" or lower. Specifically, from the viewpoint of productivity and the viewpoint of improving the encapsulation properties of the functional compound of the microcapsule, the polymerization temperature is preferably 50° C. or higher, and more preferably 55° C. or higher, and it is preferably 90° C. or lower, more preferably 85° C. or lower, and still more preferably 80° C. or lower.

From the viewpoint of productivity and the viewpoint of improving the encapsulation properties of the functional compound of the microcapsule, in the case where a timing when the temperature within the reaction system reaches a predetermined polymerization temperature is prescribed as commencement of the polymerization reaction, a reaction time of the polymerization reaction is preferably 0.5 hours or more, and more preferably 1 hour or more, and it is preferably 50 hours or less, more preferably 15 hours or less, and still more preferably 10 hours or less.

From the viewpoint of reducing the amount of the polymerization initiator remaining in the reaction system, it is also preferred to maintain the state within the reaction system after the polymerization reaction to undergo an aging reaction. A reaction temperature of the aging reaction is preferably 50° C. or higher, and more preferably 60° C. or higher, and it is preferably 100° C. or lower, more preferably 95° C. or lower, and still more preferably 90° C. or lower.

A reaction time of the aging reaction is preferably 0.5 hours or more, more preferably 1 hour or more, and still more preferably 2 hours or more, and it is preferably 20 hours or less, more preferably 10 hours or less, and still more preferably 5 hours or less.

[Microcapsules]

From the viewpoint of improving the retention amount of the functional compound, a median diameter of the microcapsules obtained by the present invention is preferably 0.1 μm or more, and more preferably 1 μm or more, and from the viewpoint of improving retention properties of the functional compound, it is preferably 50 μm or less, and more preferably 40 μm or less. The median diameter of the microcapsules can be measured by a method described in the section of Examples.

From the viewpoint of increasing a shell strength to improve retention properties of the functional compound of the microcapsule, a mass ratio of the shell in the microcapsule is preferably 0.5% by mass or more, more preferably 5% by mass or more, and still more preferably 10% by mass or more, and from the viewpoint of improving collapsibility of the capsule at the time of friction, it is preferably 50% by mass or less, more preferably 40% by mass or less, and still more preferably 35% by mass or less.

From the viewpoint of increasing a shell strength to improve retention properties of the functional compound of the microcapsule, a thickness of the shell in the microcapsule is preferably 10 nm or more, and more preferably 20 nm or more, and from the viewpoint of improving collapsibility of the capsule at the time of friction, it is preferably 500 nm or less, and more preferably 300 nm or less.

(Applications of Microcapsules)

The microcapsules obtained by the present invention can be used for a variety of applications. For example, the microcapsules obtained by the present invention can be suitably used for a variety of applications, inclusive of milky lotions, cosmetic liquids, skin lotions, essences, creams, gel formulations, hair treatments, cosmetics, e.g., quasi-drugs, detergents, softeners, fiber treating agents, e.g., anti-wrinkle sprays, sanitary materials, e.g., paper diapers, and aromatic agents.

(Composition)

A composition containing the microcapsules can be used as a detergent composition, a fiber treating agent composition, a cosmetic composition, an aromatic agent composition, a deodorant composition, or the like, and it is preferably used as a detergent composition or a fiber treating agent composition.

The detergent composition is preferably a detergent composition for body or a detergent composition for clothes, and more preferably a detergent composition for clothes. Examples of the detergent composition for body include a skin detergent composition and a hair detergent composition, with a skin detergent composition being preferred. In addition, examples of the detergent composition include a powder detergent composition and a liquid powder detergent composition, with a liquid powder detergent composition being preferred.

The fiber treating agent composition is preferably a softener composition. Examples of the cosmetic composition include a cosmetic composition for body and a cosmetic composition for hair.

The content of the microcapsules in the composition is not particularly limited but can be varied in all sorts of ways. In the case where the composition of the present invention is used as a detergent composition or a fiber treating agent composition, from the viewpoint of thoroughly exhibiting the effects of the microcapsules obtained by the present invention, the content of the microcapsules in the composition is preferably 0.1% by mass or more, and more preferably 0.2% by mass or more, and it is preferably 20% by mass or less, and more preferably 10% by mass or less.

With respect to the aforementioned embodiments, the present invention further provides the following aspects relating to the process for producing microcapsules.

<1> A process for producing microcapsules each including a core-shell type structure having a core portion containing at least one functional compound and a shell portion, the process including:
step (1): mixing at least one functional compound, a water-soluble monomer (monomer (A)), a crosslinkable monomer having two or more (meth)acryloyl groups (monomer (B)), an oil-soluble polymerization initiator, an organic chain transfer agent, and water, to obtain a monomer emulsion; and
step (2): heating the monomer emulsion obtained in the step (1) to polymerize the monomers, thereby obtaining microcapsules,
the organic chain transfer agent having a ClogP value of 3 or less.
<2> The process for producing microcapsules as set forth in the above <1>, wherein the functional compound used in the step is preferably at least one selected from the group consisting of a fragrance material, a fragrance precursor, an oil, an antioxidant, a cooling agent, a dye, a pigment, a silicone, a solvent, and an oil-soluble polymer; more preferably at least one selected from the group consisting of a fragrance material, a fragrance precursor, an oil, an antioxidant, a cooling agent, and a solvent; and still more preferably at least one selected from the group consisting of a fragrance material, a fragrance precursor, and a cooling agent.
<3> The process for producing microcapsules as set forth in the above <2>, wherein the fragrance material is at least one selected from the group consisting of a terpene-based alcohol, a terpene-based ketone, an aromatic aldehyde, an aromatic ester, and a fatty acid ester.
<4> The process for producing microcapsules as set forth in the above <2>, wherein the fragrance precursor is at least one selected from the group consisting of a silicic acid ester compound having an alkoxy component derived from a fragrance alcohol and a fatty acid ester compound having an alkoxy component derived from a fragrance alcohol.
<5> The process for producing microcapsules as set forth in the above <2>, wherein the functional compound is preferably a terpene-based alcohol, and more preferably L-menthol.
<6> The process for producing microcapsules as set forth in any one of the above <1> to <5>, wherein the monomer (A) is a monomer having a ClogP value of 1.0 or less.
<7> The process for producing microcapsules as set forth in any one of the above <1> to <6>, wherein the monomer (A) has one or two carboxy groups.
<8> The process for producing microcapsules as set forth in any one of the above <1> to <7>, wherein the monomer (A) has one carboxy group.
<9> The process for producing microcapsules as set forth in any one of the above <1> to <8>, wherein the monomer (A) has a structure having an ethylenic double bond.
<10> The process for producing microcapsules as set forth in the above <9>, wherein the structure having an ethylenic double bond is a (meth)acryloyl structure, a vinyl structure, or an allyl structure, and preferably a (meth)acryloyl structure.
<11> The process for producing microcapsules as set forth in any one of the above <1> to <10>, wherein the monomer (A) is preferably at least one selected from the group consisting of methacrylic acid, acrylic acid, fumaric acid, maleic acid, itaconic acid, 2-hydroxyethyl methacrylate, glycidyl methacrylate, polyethylene glycol methacrylate, N,N-dimethylaminoethyl methacrylate, and methyl acrylate; more preferably at least one selected from the group consisting of methacrylic acid, acrylic acid, and 2-hydroxyethyl methacrylate; and still more preferably methacrylic acid.
<12> The process for producing microcapsules as set forth in any one of the above <1> to <11>, wherein the use amount of the monomer (A) is preferably 25% by mass or more, more preferably 30% by mass or more, and still more preferably 35% by mass or more, and it is preferably 80% by mass or less, more preferably 70% by mass or less, and still more preferably 60% by mass or less, based on 100% by mass of a total amount of the monomers used.
<13> The process for producing microcapsules as set forth in any one of the above <1> to <12>, wherein the monomer (B) is at least one selected from the group consisting of a diester between a diol compound and (meth)acrylic acid, urethane diacrylate, a diester between a trihydric or higher polyhydric alcohol and (meth)acrylic acid, a triester between a trihydric or higher polyhydric alcohol and (meth)acrylic acid, and a tetraester between a trihydric or higher polyhydric alcohol and (meth)acrylic acid.
<14> The process for producing microcapsules as set forth in any one of the above <1> to <13>, wherein the monomer (B) is preferably at least one selected from the group consisting of ethylene glycol di(meth)acrylate, 1,4-butanediol di(meth)acrylate, 1,3-butanediol di(meth)acrylate, 1,6-hexanediol di(meth)acrylate, and 1,10-decanediol di(meth)acrylate; more preferably at least one selected from the group consisting of ethylene glycol di(meth)acrylate, 1,4-butanediol di(meth)acrylate, 1,3-butanediol di(meth)acrylate, and 1,6-hexanediol di(meth)acrylate; and still more preferably ethylene glycol dimethacrylate.

<15> The process for producing microcapsules as set forth in any one of the above <1> to <14>, wherein the use amount of the monomer (B) is preferably 10% by mass or more, more preferably 20% by mass or more, and still more preferably 25% by mass or more, and it is preferably 60% by mass or less, more preferably 50% by mass or less, and still more preferably 45% by mass or less, based on 100% by mass of a total amount of the monomers used.

<16> The process for producing microcapsules as set forth in any one of the above <1> to <15>, wherein in the step (1), other monomer than the monomers (A) and (B) is further used.

<17> The process for producing microcapsules as set forth in the above <16>, wherein the other monomer than the monomers (A) and (B) is at least one selected from the group consisting of a (meth)acrylic acid ester having a ClogP value of more than 1.0, a styrene, an olefin, a halovinyl compound, a vinyl ester, a vinyl ether, a vinylidene halide, and an N-vinyl compound.

<18> The process for producing microcapsules as set forth in the above <16> or <17>, wherein the other monomer than the monomers (A) and (B) is preferably at least one selected from the group consisting of methyl methacrylate, ethyl (meth)acrylate, and propyl (meth)acrylate; more preferably methyl (meth)acrylate or ethyl (meth)acrylate; and still more preferably methyl (meth)acrylate.

<19> The process for producing microcapsules as set forth in any one of the above <16> to <18>, wherein the use amount of the other monomer than the monomers (A) and (B) is preferably 1% by mass or more, and more preferably 5% by mass or more, and it is preferably 20% by mass or less, and more preferably 15% by mass or less, based on 100% by mass of a total amount of the monomers used.

<20> The process for producing microcapsules as set forth in any one of the above <1> to <19>, wherein the oil-soluble polymerization initiator is preferably an azo-based initiator or a peroxide-based initiator; more preferably 2,2'-azobisisobutyronitrile, 2,2'-azobi s(2,4-dimethylvaleronitrile), dimethyl-2,2'-azobis(2-methylpropionate), lauroyl peroxide, benzoyl peroxide, octanoyl peroxide, benzoyl orthochloroperoxide, methyl ethyl ketone peroxide, diisopropyl peroxydicarbonate, cumene hydroperoxide, t-butyl hydroperoxide, or t-butyl peroxyneodecanoate; and still more preferably 2,2' -azobis(2,4-dimethylvaleronitrile).

<21> The process for producing microcapsules as set forth in any one of the above <1> to <20>, wherein the use amount of the oil-soluble polymerization initiator is preferably 0.1 parts by mass or more, and more preferably 0.3 parts by mass or more, and it is preferably 10 parts by mass or less, and more preferably 5 parts by mass or less, based on 100 parts by mass of a total amount of the monomers used.

<22> The process for producing microcapsules as set forth in any one of the above <1> to <21>, wherein the organic chain transfer agent is preferably a thiol compound; more preferably at least one selected from the group consisting of 2-mercaptoethanesulfonic acid, thiomalic acid, 1-thioglycerol, N-acetylcysteine, mercaptoethanol, mercaptoacetic acid, mercaptopropanol, 3-mercaptopropionic acid, 1,8-dimercapto-3,6-dioxaoctane, ethanethiol, 2-ethyl thioglycolate, ethanethiol, 2-methyl-2-propanethiol, 1-butanethiol, and thiophenol; and more preferably at least one selected from the group consisting of 1-thioglycerol, N-acetylcysteine, 3-mercaptopropionic acid, and 2-ethyl thioglycolate.

<23> The process for producing microcapsules as set forth in any one of the above <1> to <22>, wherein the use amount of the organic chain transfer agent is 0.05 parts by mass or more and 10 parts by mass or less based on 100 parts by mass of a total amount of the monomers used.

<24> The process for producing microcapsules as set forth in any one of the above <1> to <22>, wherein the use amount of the organic chain transfer agent is 0.05 parts by mass or more and 5 parts by mass or less based on 100 parts by mass of a total amount of the monomers used.

<25> The process for producing microcapsules as set forth in any one of the above <1> to <22>, wherein the use amount of the organic chain transfer agent is 0.1 parts by mass or more and 5 parts by mass or less based on 100 parts by mass of a total amount of the monomers used.

<26> The process for producing microcapsules as set forth in any one of the above <1> to <22>, wherein the use amount of the organic chain transfer agent is 0.1 parts by mass or more and 3 parts by mass or less based on 100 parts by mass of a total amount of the monomers used.

<27> The process for producing microcapsules as set forth in any one of the above <1> to <22>, wherein the use amount of the organic chain transfer agent is 0.5 parts by mass or more and 10 parts by mass or less based on 100 parts by mass of a total amount of the monomers used.

<28> The process for producing microcapsules as set forth in any one of the above <1> to <27>, wherein the use amount of the organic chain transfer agent is preferably 0.5 parts by mass or more, more preferably 1.0 part by mass or more, and still more preferably 1.5 parts by mass or more, and it is preferably 20 parts by mass or less, more preferably 10 parts by mass or less, and still more preferably 5 parts by mass or less, based on 100 parts by mass of the use amount of the monomer (A).

<29> The process for producing microcapsules as set forth in any one of the above <1> to <28>, wherein the step (1) includes the following steps (1-1) to (1-3):

step (1-1): mixing at least one functional compound, a water-soluble monomer (monomer (A)), a crosslinkable monomer having two or more (meth)acryloyl groups (monomer (B)), and an oil-soluble polymerization initiator, to obtain an oily solution;

step (1-2): mixing an organic chain transfer agent having a ClogP value of 3 or less, an emulsifier, and water, to obtain an aqueous solution; and step (1-3): mixing the oily solution obtained in the step (1-1) and the aqueous solution obtained in the step (1-2) and emulsifying the mixture, to obtain a monomer emulsion.

<30> The process for producing microcapsules as set forth in the above <29>, wherein in the step (1-3), a mixing ratio of the oily solution and the aqueous solution is preferably 5% by mass or more, more preferably 10% by mass or more, and still more preferably 15% by mass or more, and it is preferably 50% by mass or less, more preferably 40% by mass or less, and still more preferably 35% by mass or less, in terms of a concentration of the oily solution in the obtained monomer emulsion.

<31> The process for producing microcapsules as set forth in any one of the above <1> to <30>, wherein a median diameter of the microcapsules obtained is preferably 0.1 μm or more, and more preferably 1 μm or more, and it is preferably 50 μm or less, and more preferably 40 μm or less.

<32> The process for producing microcapsules as set forth in any one of the above <1> to <31>, wherein a mass ratio of the shell in the microcapsule obtained is preferably 0.5% by mass or more, more preferably 5% by mass or more, and still more preferably 10% by mass or more, and it is preferably 50% by mass or less, more preferably 40% by mass or less, and still more preferably 35% by mass or less.

<33> The process for producing microcapsules as set forth in any one of the above <1> to <32>, wherein a thickness of the shell in the microcapsule obtained is preferably 10 nm or more, and more preferably 20 nm or more, and it is preferably 500 nm or less, and more preferably 300 nm or less.

<34> The process for producing microcapsules as set forth in any one of the above <1> to <33>, wherein a composition containing the microcapsules obtained is used preferably as a detergent composition, a fiber treating agent composition, a cosmetic composition, an aromatic agent composition, or a deodorant composition, and more preferably as a detergent composition or a fiber treating agent composition.

<35> Use of microcapsules produced by the process as set forth in any one of the above <1> to <34> as a fiber treating agent.

<36> Use of microcapsules produced by the process as set forth in any one of the above <1> to <34> as a detergent or a softener.

<37> Use of microcapsules produced by the process as set forth in any one of the above <1> to <34> as a cosmetic.

<38> Use of microcapsules produced by the process as set forth in any one of the above <1> to <34> as a skin care product or a hair care product.

<39> Use of microcapsules produced by the process as set forth in any one of the above <1> to <34> as a shampoo, a hair conditioner, or a hair treatment.

EXAMPLES

Various measurements were performed by the following methods.
(1) Median Diameter The median diameter of the microcapsules was measured using a laser diffraction/scattering particle size distribution analyzer "LA-950" (manufactured by Horiba, Ltd.). The measurement was performed using a flow cell, and water was used as a dispersion medium. A refractive index was set to 1.333-i for the dispersion medium and 1.48-0i for a dispersoid, respectively. A dispersion containing the particles to be measured was added into the flow cell, and the measurement was carried out at a concentration at which a transmittance thereof was near 90%, to determine the median diameter.
(2) Value of ClogP of Organic Chain Transfer Agent The ClogP value of the organic chain transfer agent was calculated by using EPI Suite (EPIWEB ver. 4.1) provided by the US EPA.

Example 1

A 300-mL beaker was charged with 108 g of a polyvinyl alcohol aqueous solution (2% by mass) and 0.10 g of 1-thioglycerol (ClogP value=−0.84), and then charged with a mixture of 3.22 g of methacrylic acid (ClogP value=0.93), 2.86 g of ethylene glycol dimethacrylate, 1.06 g of methyl methacrylate (ClogP value=1.28), 40.6 g of a menthol solution (L-menthol/2-ethylhexanoic acid triglyceride ("EXCEPARL TGO", manufactured by Kao Corporation)=1/1 (mass ratio)), and 0.13 g of 2,2'-azobis(2,4-dimethylvaleronitrile), and the contents were emulsified with stirring for 5 minutes.

The emulsion was transferred into a 300-mL four-necked flask, subjected to a polymerization reaction at 65° C. for 5 hours in a nitrogen atmosphere, and further aged at 75° C. for 3 hours. Thereafter, 0.262 g of xanthan gum ("KEL-DENT", manufactured by DSP Gokyo Food & Chemical Co., Ltd.) was added, and the mixture was stirred at 65° C. for 1 hour and then cooled to obtain a dispersion of microcapsules having L-menthol encapsulated therein. The median diameter of particles of the microcapsules in such a dispersion was 5.9 μm.

Example 2

A 300-mL beaker was charged with 108 g of a polyvinyl alcohol aqueous solution (2% by mass) and 0.10 g of 2-ethyl thioglycolate (ClogP value=0.81), and then charged with a mixture of 3.14 g of methacrylic acid, 3.00 g of ethylene glycol dimethacrylate, 1.00 g of methyl methacrylate, 40.6 g of a menthol solution (L-menthol/2-ethylhexanoic acid triglyceride ("EXCEPARL TGO", manufactured by Kao Corporation)=1/1 (mass ratio)), and 0.13 g of 2,2'-azobis(2,4-dimethylvaleronitrile), and the contents were emulsified with stirring for 5 minutes.

A dispersion of microcapsules having L-menthol encapsulated therein was obtained in the same manner as in Example 1, except for using the resulting emulsion. The median diameter of particles of the microcapsules in such a dispersion was 4.8 μm.

Example 3

A 300-mL beaker was charged with 107 g of a polyvinyl alcohol aqueous solution (2% by mass) and 0.50 g of N-acetylcysteine (ClogP value=−0.66), and then charged with a mixture of 3.22 g of methacrylic acid, 2.86 g of ethylene glycol dimethacrylate, 1.06 g of methyl methacrylate, 40.6 g of a menthol solution (L-menthol/2-ethylhexanoic acid triglyceride ("EXCEPARL TGO", manufactured by Kao Corporation)=1/1 (mass ratio)), and 0.13 g of 2,2'-azobis(2,4-dimethylvaleronitrile), and the contents were emulsified with stirring for 5 minutes.

A dispersion of microcapsules having L-menthol encapsulated therein was obtained in the same manner as in Example 1, except for using the resulting emulsion. The median diameter of particles of the microcapsules in such a dispersion was 4.7 μm.

Example 4

A 300-mL beaker was charged with 107 g of a polyvinyl alcohol aqueous solution (2% by mass) and 0.10 g of 1-thioglycerol (ClogP value=−0.84), and then charged with a mixture of 4.16 g of methacrylic acid, 3.00 g of ethylene glycol dimethacrylate, 40.6 g of a menthol solution (L-menthol/2-ethylhexanoic acid triglyceride ("EXCEPARL TGO", manufactured by Kao Corporation)=1/1 (mass ratio)), and 0.13 g of 2,2'-azobis(2,4-dimethylvaleronitrile), and the contents were emulsified with stirring for 5 minutes.

A dispersion of microcapsules having L-menthol encapsulated therein was obtained in the same manner as in Example 1, except for using the resulting emulsion. The median diameter of particles of the microcapsules in such a dispersion was 5.1 μm.

Example 5

A 300-mL beaker was charged with 107 g of a polyvinyl alcohol aqueous solution (2% by mass) and 0.10 g of 3-mercaptopropionic acid (ClogP value=0.43), and then charged with a mixture of 3.14 g of methacrylic acid, 2.99 g of ethylene glycol dimethacrylate, 1.00 g of methyl methacrylate, 40.6 g of a menthol solution (L-menthol/2-ethylhexanoic acid triglyceride ("EXCEPARL TGO", manufactured by Kao Corporation)=1/1 (mass ratio)), and 0.13 g of 2,2'-azobis(2,4-dimethylvaleronitrile), and the contents were emulsified with stirring for 5 minutes.

A dispersion of microcapsules having L-menthol encapsulated therein was obtained in the same manner as in Example 1, except for using the resulting emulsion. The median diameter of particles of the microcapsules in such a dispersion was 6.1 μm.

Example 6

An emulsion was obtained in the same manner as in Example 2, except for changing the use amount of the 2-ethyl thioglycolate to 0.05 g.

A dispersion of microcapsules having L-menthol encapsulated therein was obtained in the same manner as in Example 1, except for using the resulting emulsion. The median diameter of particles of the microcapsules in such a dispersion was 5.7 μm.

Example 7

An emulsion was obtained in the same manner as in Example 3, except for changing the use amount of the N-acetylcysteine to 0.10 g.

A dispersion of microcapsules having L-menthol encapsulated therein was obtained in the same manner as in Example 1, except for using the resulting emulsion. The median diameter of particles of the microcapsules in such a dispersion was 6.5 μm.

Example 8

A 300-mL beaker was charged with 107 g of a polyvinyl alcohol aqueous solution (2% by mass) and 0.10 g of 1-thioglycerol (ClogP value=−0.84), and then charged with a mixture of 4.15 g of methacrylic acid, 3.01 g of pentaerythritol triacrylate, 40.6 g of a menthol solution (L-menthol/2-ethylhexanoic acid triglyceride ("EXCEPARL TGO", manufactured by Kao Corporation)=1/1 (mass ratio)), and 0.13 g of 2,2'-azobis(2,4-dimethylvaleronitrile), and the contents were emulsified with stirring for 5 minutes.

The emulsion was transferred into a 300-mL four-necked flask, subjected to a polymerization reaction at 65° C. for 5 hours in a nitrogen atmosphere, and further aged at 75° C. for 3 hours, followed by cooling to obtain a dispersion of microcapsules having L-menthol encapsulated therein. The median diameter of particles of the microcapsules in such a dispersion was 5.7 μm.

Example 9

A 300-mL beaker was charged with 107 g of a polyvinyl alcohol aqueous solution (2% by mass) and 0.10 g of 1-thioglycerol (ClogP value=−0.84), and then charged with a mixture of 4.15 g of 2-hydroxyethyl methacrylate (ClogP value=0.47), 3.00 g of ethylene glycol dimethacrylate, 40.6 g of a menthol solution (L-menthol/2-ethylhexanoic acid triglyceride ("EXCEPARL TGO", manufactured by Kao Corporation)=1/1 (mass ratio)), and 0.13 g of 2,2'-azobis(2, 4-dimethylvaleronitrile), and the contents were emulsified with stirring for 5 minutes.

A dispersion of microcapsules having L-menthol encapsulated therein was obtained in the same manner as in Example 8, except for using the resulting emulsion. The median diameter of particles of the microcapsules in such a dispersion was 7.7 μm.

Example 10

A 300-mL beaker was charged with 107 g of a polyvinyl alcohol aqueous solution (2% by mass) and then charged with a mixture of 3.15 g of methacrylic acid (ClogP value=0.93), 3.00 g of ethylene glycol dimethacrylate, 1.00 g of methyl methacrylate (ClogP value=1.28), 40.6 g of a menthol solution (L-menthol/2-ethylhexanoic acid triglyceride ("EXCEPARL TGO", manufactured by Kao Corporation)=1/1 (mass ratio)), and 0.13 g of 2,2'-azobis(2,4-dimethylvaleronitrile), and the contents were emulsified with stirring for 5 minutes.

The emulsion was transferred into a 300-mL four-necked flask and heated in a nitrogen atmosphere, and 0.12 g of 1-thioglycerol (ClogP value=−0.84) was then added at 55° C. The contents were subjected to a polymerization reaction at 65° C. for 5 hours and further aged at 75° C. for 3 hours, followed by cooling to obtain a dispersion of microcapsules having L-menthol encapsulated therein. The median diameter of particles of the microcapsules in such a dispersion was 6.3 μm.

Comparative Example 1

A dispersion of microcapsules having L-menthol encapsulated therein was obtained in the same manner as in Example 1, except for not adding the 1-thioglycerol. The median diameter of particles of the microcapsules in such a dispersion was 4.8 μm.

Comparative Example 2

A dispersion of microcapsules having L-menthol encapsulated therein was obtained in the same manner as in Example 1, except for using sodium hypophosphite monohydrate in place of the 1-thioglycerol. The median diameter of particles of the microcapsules in such a dispersion was 4.8 μm.

Comparative Example 3

A 300-mL beaker was charged with 107 g of a polyvinyl alcohol aqueous solution (2% by mass) and 0.10 g of 1-thioglycerol, and then charged with a mixture of 2.86 g of ethylene glycol dimethacrylate, 4.28 g of methyl methacrylate, 40.6 g of a menthol solution (L-menthol/2-ethylhexanoic acid triglyceride ("EXCEPARL TGO", manufactured by Kao Corporation)=1/1 (mass ratio)), and 0.13 g of 2,2'-azobis(2,4-dimethylvaleronitrile), and the contents were emulsified with stirring for 5 minutes.

A dispersion of microcapsules having L-menthol encapsulated therein was obtained in the same manner as in Example 1, except for using the resulting emulsion. The median diameter of particles of the microcapsules in such a dispersion was 5.3 μm.

Comparative Example 4

A dispersion of microcapsules having L-menthol encapsulated therein was obtained in the same manner as in Example 1, except for using 2-ethylhexyl thioglycolate (ClogP value=3.68) in place of the 1-thioglycerol. The median diameter of particles of the microcapsules in such a dispersion was 6.2 μm.

Comparative Example 5

A dispersion of microcapsules having L-menthol encapsulated therein was obtained in the same manner as in Example 9, except for not adding the 1-thioglycerol. The median diameter of particles of the microcapsules in such a dispersion was 8.3 μm.

Example 11

A 300-mL beaker was charged with 125 g of a polyvinyl alcohol aqueous solution (2% by mass) and 0.12 g of 1-thioglycerol, and then charged with a mixture of 4.97 g of methacrylic acid, 2.40 g of ethylene glycol dimethacrylate, 1.20 g of methyl methacrylate, 20.0 g of fragrance material A and 0.13 g of 2,2'-azobis(2,4-dimethylvaleronitrile), and the contents were emulsified with stirring for 5 minutes.

The emulsion was transferred into a 300-mL four-necked flask, subjected to a polymerization reaction at 65° C. for 5 hours in a nitrogen atmosphere, and further aged at 75° C. for 3 hours. Thereafter, 0.308 g of xanthan gum ("KELDENT", manufactured by DSP Gokyo Food & Chemical Co., Ltd.) was added, and the mixture was stirred at 65° C. for 1 hour and then cooled to obtain a dispersion of microcapsules having a fragrance material A encapsulated therein. The median diameter of particles of the microcapsules in such a dispersion was 12.5 μm.

<Fragrance Material A>

A composition of the fragrance material A used in Example 11 is shown in Table 1. A specific gravity of the fragrance material A is 0.96.

TABLE 1

| Fragrance component | Content (mass %) | ClogP |
|---|---|---|
| Hexyl acetate | 10 | 2.8 |
| Methyl dihydrojasmonate | 10 | 3.0 |
| Tetrahydrolinalool | 10 | 3.6 |
| α-Ionone | 10 | 4.3 |
| Lilial | 20 | 4.4 |
| Hexyl cinnamaldehyde | 20 | 4.8 |
| Hexyl salicylate | 20 | 5.1 |

Comparative Example 6

A dispersion of microcapsules having the fragrance material A encapsulated therein was obtained in the same manner as in Example 11, except for not adding the 1-thioglycerol. The median diameter of particles of the microcapsules in such a dispersion was 13.9 μm.

(Evaluation of Encapsulation Stability)

Using the above-obtained microcapsules, a softener composition A having a composition shown in Table 2 was prepared and stored at 40° C. for 3 weeks. At this time, with respect to the microcapsules having L-menthol encapsulated therein, blending was performed such that the concentration of menthol in the softener was 0.05% by mass. In addition, with respect to the microcapsules having the fragrance material encapsulated therein, blending was performed such that the concentration of the fragrance material in the softener was 0.15% by mass. In Table 2, a cationic softening base agent is one produced by quaternizing an ester amine obtained through a reaction between a vegetable fatty acid and triethanolamine in a molar ratio of 1.65/1, with dimethyl sulfate by a known method. In addition, the softener composition A was blended such that a pH of a liquid softening and finishing agent was 3.2.

TABLE 2

| Softener composition A | Blending amount (parts by mass) |
|---|---|
| Cationic softening base agent | 13 |
| Polyoxyethylene (21) lauryl ether | 3.5 |
| Calcium chloride | 0.3 |
| PROXEL BDN | 0.03 |
| Ion exchanged water | 81.97 |
| Microcapsules described in each of Examples or Comparative Examples | 1.2 |
| Total | 100 |

A value of the content of the fragrance material after three weeks was measured by the following analysis method, and when defining the content of the fragrance material in the softener immediately after blending as 100% by mass, the value of the content of the fragrance material after three weeks was calculated and defined as a retention rate. Here, with respect to the microcapsules having L-menthol encapsulated therein, only the content of L-menthol was analyzed. In addition, with respect to the microcapsules having the fragrance material encapsulated therein, only the fragrance component that is analytically detectable was analyzed, and values of the content of the fragrance material after one week and three weeks, respectively were calculated from the retention amount of each of the fragrance components and the blending ratio in the fragrance material A. The results are shown in Tables 3 to 9. In Examples 6 to 10 and Comparative Examples 1 to 5, the retention rate of the fragrance material after one week was measured.

<Analysis Method>

0.2 g of the stored softener was weighed and diluted with 50 mL of ion exchanged water. This was subjected to vacuum filtration with a 1.2-μm isopore membrane filter, and the filter was then dipped in 2 mL of acetonitrile and ultrasonically treated for 1 hour. The resultant was subjected to vacuum filtration with a 0.2-μm membrane filter of a cellulose acetate type, and the filtrate was analyzed by means of gas chromatography. Each of the stored samples was analyzed three times, and an average value thereof was defined as an analyzed value.

In Tables 3 to 9, the following are described.

MAA: Methacrylic acid

EGDMA: Ethylene glycol dimethacrylate

MMA: Methyl methacrylate

PETIA: Pentaerythritol triacrylate

HEMA: 2-Hydroxyethyl methacrylate

TABLE 3

| | Example | | | | | Comparative Example | | | |
|---|---|---|---|---|---|---|---|---|---|
| | 1 | 2 | 3 | 4 | 5 | 1 | 2 | 3 | 4 |
| Material to be encapsulated | Menthol | Menthol | Menthol | Menthol | Menthol | Menthol | Menthol | Menthol | Menthol |
| Monomer (A) | MAA | MAA | MAA | MAA | MAA | MAA | MAA | — | MAA |
| Monomer (B) | EGDMA | EGDMA | EGDMA | EGDMA | EGDMA | EGDMA | EGDMA | EGDMA | EGDMA |
| Other monomer | MMA | MMA | MMA | — | MMA | MMA | MMA | MMA | MMA |
| Chain transfer initiator | 1-Thio-glycerol | 2-Ethyl thioglycolate | N-Acetyl-cysteine | 1-Thio-glycerol | 3-Mercapto propionic acid | — | Sodium hypophosphite monohydrate | 1-Thio-glycerol | 2-Ethylhexyl thioglycolate |
| ClogP value | −0.84 | 0.81 | −0.66 | −0.84 | 0.43 | — | — | −0.84 | 3.68 |
| Retention rate of fragrance material after one week (mass %) | 80 | 63 | 73 | 67 | 71 | 0.61 | 1.3 | 0 | 1.07 |
| Retention rate of fragrance material after three weeks (mass %) | 46 | 16 | 27 | 49 | 58 | — | — | — | — |

TABLE 4

| | Example | |
|---|---|---|
| | 2 | 6 |
| Material to be encapsulated | Menthol | Menthol |
| Monomer (A) | MAA | MAA |
| Monomer (B) | EGDMA | EGDMA |
| Other monomer | MMA | MMA |
| Chain transfer initiator | 2-Ethyl thioglycolate | 2-Ethyl thioglycolate |
| ClogP value | 0.81 | 0.81 |
| Amount of chain transfer agent relative to monomers | 1.4 | 0.7 |
| Retention rate of fragrance material after one week (mass %) | 63 | 35 |

TABLE 5

| | Example | |
|---|---|---|
| | 3 | 7 |
| Material to be encapsulated | Menthol | Menthol |
| Monomer (A) | MAA | MAA |
| Monomer (B) | EGDMA | EGDMA |
| Other monomer | MMA | MMA |
| Chain transfer initiator | N-Acetylcysteine | N-Acetylcysteine |
| ClogP value | −0.66 | −0.66 |
| Amount of chain transfer agent relative to monomers | 7 | 1.4 |
| Retention rate of fragrance material after one week (mass %) | 73 | 37 |

TABLE 6

| | Example | |
|---|---|---|
| | 1 | 8 |
| Material to be encapsulated | Menthol | Menthol |
| Monomer (A) | MAA | MAA |
| Monomer (B) | EGDMA | PETIA |
| Other monomer | MMA | — |
| Chain transfer initiator | 1-Thioglycerol | 1-Thioglycerol |
| ClogP value | −0.84 | −0.84 |
| Retention rate of fragrance material after one week (mass %) | 80 | 32.8 |

TABLE 7

| | Example 9 | Comparative Example 5 |
|---|---|---|
| Material to be encapsulated | Menthol | Menthol |
| Monomer (A) | HEMA | HEMA |
| Monomer (B) | EGDMA | EGDMA |
| Other monomer | — | — |
| Chain transfer initiator | 1-Thioglycerol | — |
| ClogP value | −0.84 | — |
| Retention rate of fragrance material after one week (mass %) | 14.7 | 4.1 |

TABLE 8

| | Example | |
|---|---|---|
| | 1 | 10 |
| Material to be encapsulated | Menthol | Menthol |
| Monomer (A) | MAA | MAA |
| Monomer (B) | EGDMA | EGDMA |
| Other monomer | MMA | MMA |
| Chain transfer initiator | 1-Thioglycerol | 1-Thioglycerol |
| ClogP value | −0.84 | −0.84 |
| Heating at the time of preparation of emulsion | No | Yes |
| Retention rate of fragrance material after one week (mass %) | 80 | 78 |

TABLE 9

| | Example 11 | Comparative Example 6 |
|---|---|---|
| Material to be encapsulated | Fragrance material A | Fragrance material A |
| Monomer (A) | MAA | MAA |
| Monomer (B) | EGDMA | EGDMA |
| Other monomer | MMA | MMA |
| Chain transfer initiator | 1-Thioglycerol | — |
| ClogP value | −0.84 | — |
| Retention rate of fragrance material after one week (mass %) | 85 | 76 |
| Retention rate of fragrance material after three weeks (mass %) | 38 | 29 |

When comparison was made among the microcapsules having L-menthol encapsulated therein, in Comparative Examples 1 to 5, as a result of production without jointly using the water-soluble monomer (monomer (A)) and the organic chain transfer agent having a ClogP value of 3 or less, after storing for one week, the material to be encapsulated substantially vanished, and the encapsulation stability of the functional compound, such as a fragrance material, was inferior. In contrast, in Examples 1 to 10, the microcapsules having excellent encapsulation stability of the functional compound, such as a fragrance material, could be obtained.

In addition, when comparison was made among the microcapsules having the fragrance material A encapsulated therein, in Comparative Example 6 in which the production was performed without using the organic chain transfer agent having a ClogP value of 3 or less, the content of the fragrance material after three weeks was 29% by mass, whereas in Example 11 in which the production was performed by jointly using the water-soluble monomer (monomer (A)) and the organic chain transfer agent having a ClogP value of 3 or less, the content of the fragrance material after three weeks was 38% by mass, and the encapsulation stability of the fragrance material could be conspicuously improved.

The invention claimed is:

1. A process for producing microcapsules each comprising a core-shell structure having a core portion comprising at least one functional compound and a shell portion, the process comprising:
    mixing at least one functional compound, a water-soluble monomer (monomer (A)), a crosslinkable monomer having two or more (meth)acryloyl groups (monomer (B)), an oil-soluble polymerization initiator, an organic chain transfer agent, and water, to obtain a monomer emulsion; and
    heating said monomer emulsion to polymerize the monomers, thereby obtaining microcapsules,
    wherein the organic chain transfer agent has a ClogP value of 3 or less and is a thiol compound,
    wherein the monomer (A) has a ClogP value of 1.0 or less, and a use amount of the monomer (A) is 25% by mass or more and 80% by mass or less based on 100% by mass of a total amount of the monomers used, and
    wherein the monomer (A) is at least one selected from the group consisting of methacrylic acid, acrylic acid, fumaric acid, maleic acid, and itaconic acid.

2. The process for producing microcapsules according to claim 1, wherein a use amount of the organic chain transfer agent is 0.05 parts by mass or more and 10 parts by mass or less based on 100 parts by mass of a total amount of the monomers used.

3. The process for producing microcapsules according to claim 1, wherein a use amount of the organic chain transfer agent is 0.5 parts by mass or more and 20 parts by mass or less based on 100 parts by mass of the use amount of the monomer (A).

4. The process for producing microcapsules according to claim 1, wherein a use amount of the monomer (B) is 10% by mass or more and 60% by mass or less based on 100% by mass of a total amount of the monomers used.

5. The process for producing microcapsules according to claim 1, wherein the monomer (B) is at least one selected from the group consisting of a diester between a diol component and (meth)acrylic acid, urethane diacrylate, a diester between a trihydric or higher polyhydric alcohol and (meth)acrylic acid, a triester between a trihydric or higher polyhydric alcohol and (meth)acrylic acid, and a tetraester between a trihydric or higher polyhydric alcohol and (meth) acrylic acid.

6. The process for producing microcapsules according to claim 1, wherein the monomer (B) is at least one selected from the group consisting of ethylene glycol di(meth)acrylate, 1,4-butanediol di(meth)acrylate, 1,3-butanediol di(meth)acrylate, 1,6-hexanediol di(meth)acrylate, and 1,10-decanediol di(meth)acrylate.

7. The process for producing microcapsules according to claim 1, wherein in said mixing, at least one other monomer than the monomers (A) and (B) is further used.

8. The process for producing microcapsules according to claim 7, wherein a use amount of said other monomer than the monomers (A) and (B) is 1% by mass or more and 20% by mass or less based on 100% by mass of a total amount of the monomers used.

9. The process for producing microcapsules according to claim 1, wherein an average particle diameter of the microcapsules obtained is 0.1 μm or more and 50 μm or less.

10. The process for producing microcapsules according to claim 1, wherein said mixing comprises (1-1) to (1-3):
    (1-1): mixing at least one functional compound, a water-soluble monomer (monomer (A)), a crosslinkable monomer having two or more (meth)acryloyl groups (monomer (B)), and an oil-soluble polymerization initiator, to obtain an oily solution;
    (1-2): mixing an organic chain transfer agent having a ClogP value of 3 or less, an emulsifier, and water, to obtain an aqueous solution; and
    (1-3) mixing the oily solution obtained in (1-1) and the aqueous solution obtained in (1-2) and emulsifying the mixture, to obtain a monomer emulsion.

11. The process for producing microcapsules according to claim 1, wherein the monomer (A) is methacrylic acid.

12. The process for producing microcapsules according to claim 1, wherein the monomer (B) comprises ethylene glycol dimethacrylate.

13. The process for producing microcapsules according to claim 1, wherein the organic chain transfer agent is at least one selected from the group consisting of 1-thioglycerol, 2-ethyl thioglycolate, N-acetylcysteine and 3-mercaptopropionic acid.

14. The process for producing microcapsules according to claim 1, wherein:
    the monomer (A) is methacrylic acid;
    the monomer (B) comprises ethylene glycol dimethacrylate; and
    the organic chain transfer agent is at least one selected from the group consisting of 1-thioglycerol, 2-ethyl thioglycolate, N-acetylcysteine and 3-mercaptopropionic acid.

* * * * *